United States Patent

[11] 3,587,196

| [72] | Inventor | Frank A. Dunn, 264 Dartmouth Avenue, Fair Haven, N.J. 07701 |
| [21] | Appl. No. | 823,257 |
| [22] | Filed | May 9, 1969 |
| [45] | Patented | June 28, 1971 |

[54] METHOD OF POLISHING SOFT, WATER-SOLUBLE CRYSTALS
10 Claims, 5 Drawing Figs.

| [52] | U.S. Cl. | 51/326, 51/281, 51/283, 51/305 |
| [51] | Int. Cl. | B24b 1/00 |
| [50] | Field of Search | 51/326, 327, 328, 281, 283, 284, 305 |

[56] References Cited
UNITED STATES PATENTS

| 1,666,701 | 4/1928 | Hill | 51/305X |
| 2,024,303 | 12/1935 | Obrig | 51/305X |
| 2,528,224 | 10/1950 | Giesecke et al | 51/284 |
| 2,554,070 | 5/1951 | Stead | 51/284 |
| 2,867,954 | 1/1959 | Phillips | 51/305X |
| 3,225,497 | 12/1965 | Brandt | 51/284X |
| 3,262,233 | 7/1966 | Schrier | 51/281 |

*Primary Examiner*—Lester M. Swingle
*Attorneys*—R. J. Guenther and Arthur J. Torsiglieri ABSTRACT: A polishing technique for soft, water-soluble crystals is disclosed. The edges of the crystal are beveled to prevent crumbling; and the crystal is lapped, in an anhydrous wet lapping step and then in at least one dry lapping step. Both steps employ a nonfrayable cloth, such as nylon, embedded in a soft wax or paraffin on a flat surface and impregnated in the center region only with an abrasive of diameter less than 0.3 $\mu$ meters. The abrasive is supplied in a slurry including benzene which fluidizes the wax in the center region only. Typically, the crystals to be polished have at least one oxygen atom in each unit cell and have a hardness less than 3 Mohs.

PATENTED JUN28 1971 3,587,196

INVENTOR
F. A. DUNN
BY
Wilford L. Wisner
ATTORNEY

PATENTED JUN28 1971 3,587,196

OPTIONAL PREPARATORY STEP

EMERY POLISHING PAPER

OPTIONAL PREPARATORY STEP

EMERY POLISHING PAPER 40

OPTIONAL FINAL STEP

MICRO-POROUS URETHANE FOAM 50

METHOD OF POLISHING SOFT, WATER-SOLUBLE CRYSTALS

BACKGROUND OF THE INVENTION

This invention relates to polishing techniques for water-soluble crystals, particularly those having a hardness less than about 3 Mohs (the hardness of calcite).

In the continuing research and development directed toward future optical communication systems, water-soluble crystals have assumed increasing importance. Such crystals, such as potassium dihydrogen phosphate (KDP) or iodic acid ($HIO_4$), are frequently found to have desirable properties, such as ease of growth of large optical quality crystals, transparency, light modulating capability or optical nonlinearity. Many such crystals employed to date include at least one oxygen atom per crystalline unit cell.

Unfortunately, many such crystals are difficult to polish, either because of their softness or because they are rapidly degraded or damaged upon exposure to the usual water-based abrasive slurry used in polishing. In fact, even the exposure of some of them to a normal moist air environment rapidly degrades the surface finish.

In addition, the typical dry lapping and polishing surfaces employed in polishing harder crystals leave deep surface scratches and, in some cases, an undesirable orange peel finish on the surfaces of such soft water-soluble crystals.

A typical example of the difficulty in circumventing these problems is provided by prior polishing techniques for potassium dihydrogen phosphate (KDP), a crystal widely used in optical experiments. KDP is a transparent, brittle yet soft, water-soluble crystal. Clean polishing environments and the slowest, most careful possible procedures have been used in order to produce a scratch-free, highly polished crystal. Previous methods of polishing KDP have taken as long as 10 days. It is not possible to satisfy the growing demand for such polished crystals at these polishing rates.

SUMMARY OF THE INVENTION

I have discovered a technique for polishing water-soluble crystals which, in the initial results for KDP, has reduced the polishing time to about 2 hours per crystal face.

According to one feature of my invention, a method of polishing water-soluble crystals comprises the steps of lapping the crystal surface on a first surface of resilient nonfrayable cloth embedded in a waxy substance such as paraffin and saturated in the center region only with an abrasive in an anhydrous organic solvent capable of fluidizing the waxy substance and lapping the crystal on a second surface of resilient nonfrayable cloth embedded in a waxy substance and impregnated in the center region only by an abrasive completely dried from a slurry including an anhydrous organic solvent.

With reference to the second lapping step, it is believed that the anhydrous solvent fluidizes the waxy substance and that, after the anhydrous solvent evaporates, the waxy substance rebonds the cloth to a supporting surface thereunder. A continuous bond of the cloth to the supporting surface is maintained by the waxy substance in the area surrounding the center region.

Subsequent tests have shown that comparable results are achieved in polishing other soft, water-soluble crystals, such as iodic acid ($HIO_3$). I believe it to be applicable as well to other iodates and to other water-soluble crystals having a hardness less than about 3 Mohs, the hardness of calcite. While I do not wish to limit my invention to the polishing of oxygen-containing crystals, the water-soluble crystals polished according to my invention have thus far all had at least one oxygen atom per crystalline unit cell.

BRIEF DESCRIPTION OF THE DRAWING

Further features and advantages of my invention will become apparent from the following detailed description, taken together with the drawing in which.

DESCRIPTION OF ILLUSTRATIVE EXAMPLE

Figure 3:
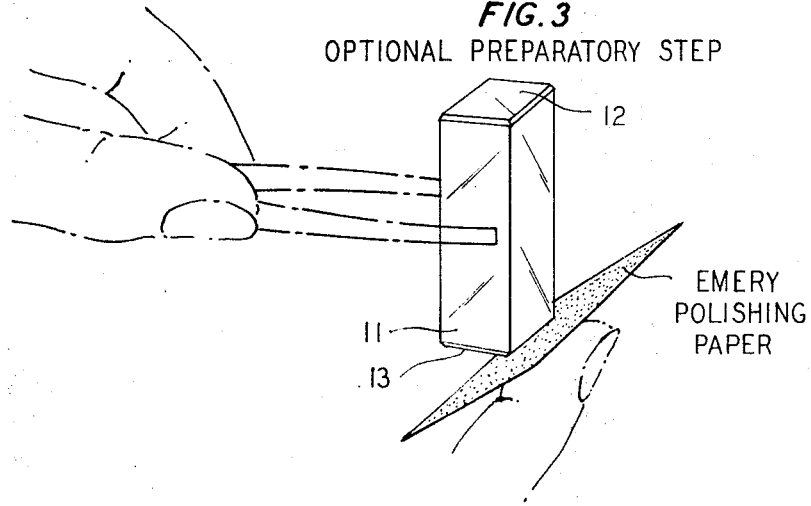
FIG. 3 shows pictorially an initial step of beveling the crystal edges.

Prior to mounting a KDP crystal 11 for polishing according to my invention, it is advantageous to bevel or round all the edges of the face or faces to be polished. A piece of 4/0–3M emery polishing paper employed manually will accomplish this result, as shown in FIG. 3. The crystal is thereby enabled to slide smoothly and without chipping of the edges. The initial distance between the surfaces 12 and 13 to be polished is illustratively about (1½) inches. Its lateral dimensions are 125 mils by 125 mils.

The KDP crystal 11 is cemented with a cement 14 in a barrel-type mount 15, which is reversibly but rigidly mounted in a polishing jig 16. A setscrew 23 holds mount 15 in the desired axial position. Four guide feet 17 are mounted on the bottom of jig 16 to provide essentially planar motion of the polishing jig. I have found it advantageous to employ four guide feet 17 which protrude downward to a level about one mil above the surface, e.g. surface 13, of crystal 11 to be polished. This result is achieved by placing a single sheet of lens paper on a planar-supporting surface under each guide foot 17 while mount 15 and crystal 11 are positioned to bring surface 13 down to the supporting surface. I have further found it advantageous to employ guide feet 17 of the same crystalline material, or similarly soft material, as the crystal being polished.

Figure 4:
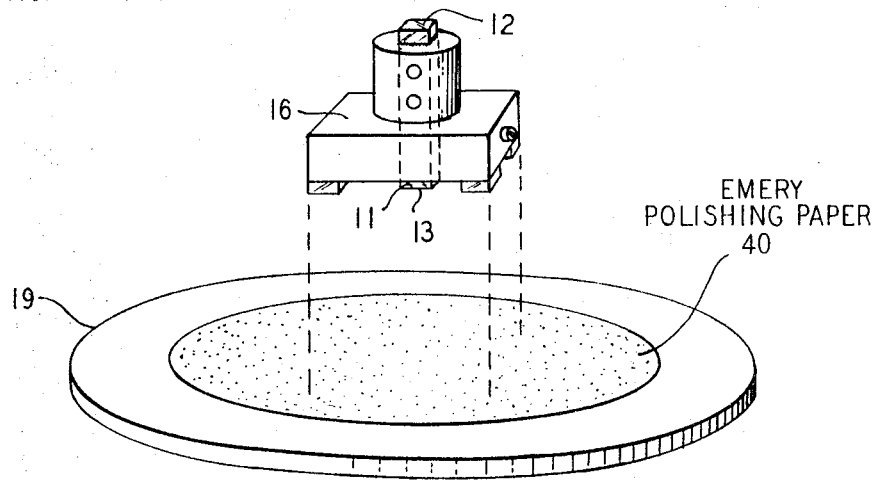
FIG. 4 shows pictorially an equipment setup for an optional preparatory step.

The surfaces 12 and 13, together with the guide feet 17, may optionally be preliminarily lapped with 4/0 3M emery polishing paper 40, a dry lapping surface appropriate for obtaining a nearly flat crystalline surface, as shown in FIG. 4. This optional step will wear down the surface 13 to the level of the feet 17.

The lap 18 employed in polishing crystal 11 in the first lapping step comprises a flat 6-inch diameter disc 19, illustratively of Plexiglass or aluminum, which supports a nylon cloth 20 of plain weave 3.7 mils thick and of 60 mesh or greater. One illustrative cloth 20 was 72 mesh in one direction and 112 mesh in the orthogonal direction. Mesh is the number of open spaces per inch. The nylon cloth 21 is bonded to disc 19 by paraffin 21, which fills the open spaces of the cloth but does not significantly protrude above the surface of the cloth.

To accomplish this bonding, the disc 19 is heated to a temperature that will just melt paraffin. Then enough paraffin is placed on it to wet the entire surface; and the nylon cloth 20 is laid in the paraffin. Any wrinkles are smoothed out; and excess paraffin is removed.

After the disc 19 is cool, a benzene slurry 22 including abrasive particles less than 0.3 $\mu$ meters in diameter is formed in the center region. It is important not to allow the benzene to make its way to the outer edge of the cloth 20, since the edge or peripheral areas of the cloth must remain bonded to disc 19 to obtain satisfactory results. It has been found that the benzene slurry actually lowers the surface of the lap as compared to the surrounding area. For this reason, the feet 17 as well as the crystal 11 must be lapped within the region affected by the slurry.

Now the polishing jig 16 is lowered to the lap 18, either manually or by machine and moved in a figure "8" pattern, illustratively about 200 to 300 times, within the region affected by the slurry. Best results were obtained when this first lapping step was continued until the benzene had at least partly dried.

Figure 1:
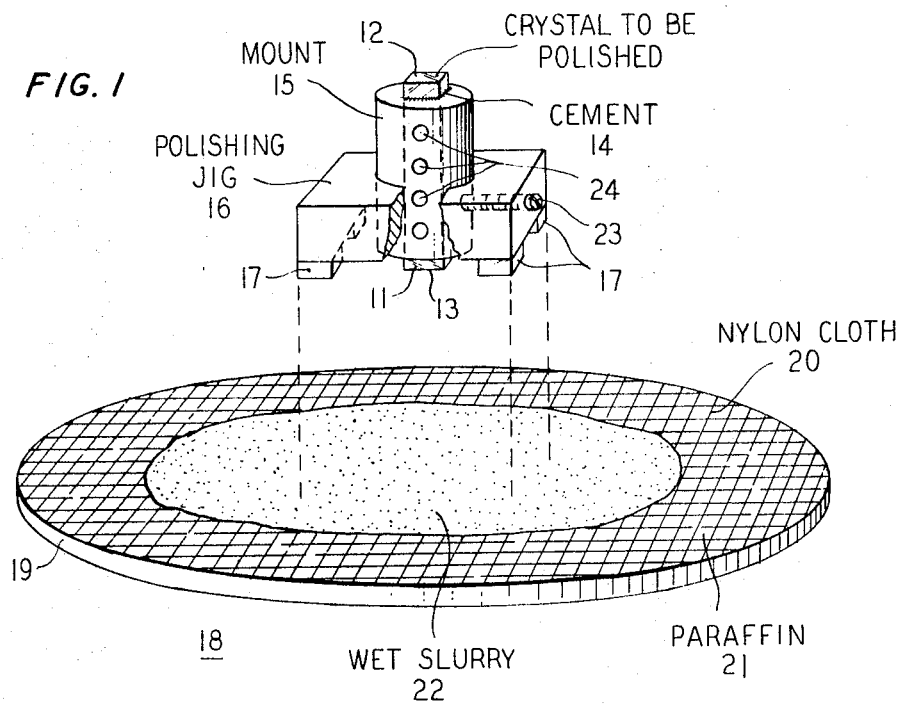
FIG. 1 shows pictorially an equipment setup for performing the first step of an illustrative example of my invention.
Figure 2:
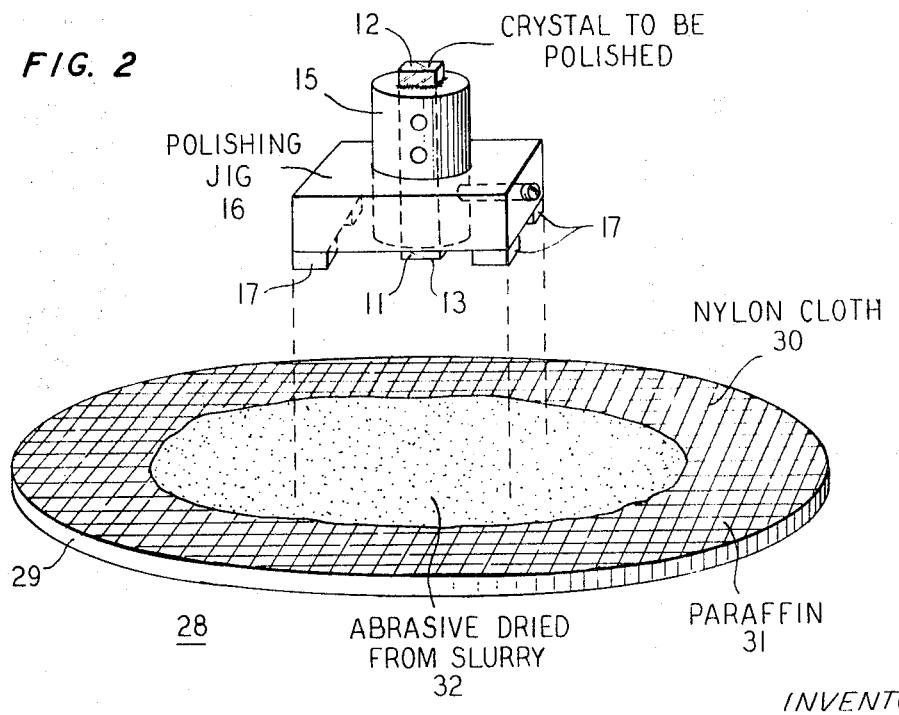
FIG. 2 shows pictorially an equipment setup for performing the second step of an illustrative example of my invention.

For the second lapping step, lapping can be continued on the just-dried lap until all scratches are removed. Nevertheless, it has been found advantageous to employ a second lap 28 for the second lapping step, as shown in FIG. 2. The use of two laps permits greater speed, since the first lapping step can be terminated before the slurry on lap 18 completely dries.

In FIG. 2, sample 11 remains mounted in jig 16.

The lap 28 is made in identical fashion to lap 18, except that the benzene slurry 23 has been dried completely, preferably during previous lapping of some water-soluble crystal at least as soft as crystal 11. It is believed that the benzene attacks the paraffin, fluidizes it and then evaporates. During the evaporation, it is believed that the paraffin rebonds the cloth 30, disc 29 and abrasive particles in an advantageous manner. The previous lapping of a crystal upon lap 28 ensures that the minimum thickness of cloth, paraffin and abrasive has been achieved in the region of lap 28 in which the slurry dried.

The mounting jig 16 is then lowered to lap 28 and moved in a figure "8" pattern until the desired surface finish, free of scratches, is achieved.

At the conclusion of the second lapping step, the mount 15 is removed and rotated 180°; it is then reinserted and held rigidly at the desired axial position by setscrew 23. Surface 12 is polished as described above.

The crystal 11 is then removed from barrel 15 by dissolving the cement. Acetone is used in the preferable case, for which the cement is soluble in acetone. Holes 24 in the sides of mount 15 allow the acetone to attack the cement as freely as possible, so that quick removal of crystal 11 is made possible.

It is believed important in the foregoing steps that the slurry is anhydrous, that is devoid of water. It may also be significant that the benzene, or other organic solvent used in the slurry, be capable of fluidizing the paraffin or other soft wax and also capable of allowing it to rebond the cloth, disc and abrasives upon evaporation.

In the event that other soft waxes are used instead of paraffin, they should have a melting point lower than that temperature which would damage the cloth.

I also consider it highly advantageous for my process that nylon is a durable nonfrayable cloth. Its mesh (spaces per linear inch) is preferably greater than 60.

It should be noted that KDP, iodic acid and other crystals polishable according to my invention all have a hardness less than 3 Mohs, the hardness of calcite.

Figure 5:
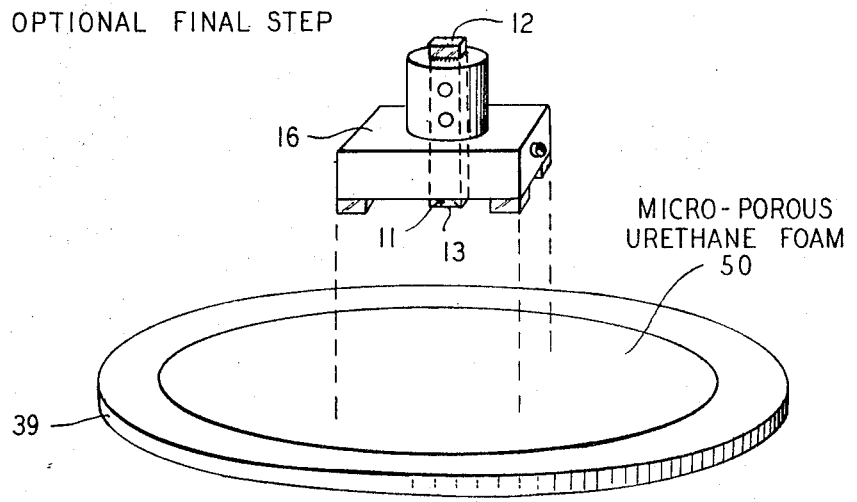
FIG. 5 shows pictorially an equipment setup for an optional final step.

An optional, relatively slow final polishing step may be employed, as shown in FIG. 5. A thin microporous urethane foam material 50 is used instead of nylon prepared as a dry lap in the manner of lap 18 of FIG. 2. All loose particles are shaken from the dried lap before use. The urethane foam need not be bonded by wax or paraffin to the supporting disc 39, although it could be. I have typically omitted this optional step as unnecessary.

Upon completion of polishing, the crystal 11 should be mounted for use quickly before it is damaged by moisture in the air. I suggest that matching oil be coated on both polished surfaces and antireflection-coated flat transparent glass plates be placed thereover. Parallelism of the polished crystal surfaces is thereby made less critical. The assembly should be stored in an airtight jar with dessicant added to the jar.

I claim:

1. A method of polishing water-soluble crystals, comprising the steps of
   lapping the crystal surface on a first surface of resilient, nonfrayable cloth embedded in a first waxy substance having a melting temperature lower than the temperature which would damage said cloth and saturated in the center region only with an abrasive in an anhydrous organic solvent capable of fluidizing the waxy substance, and
   lapping the crystal on a second surface of resilient, nonfrayable cloth embedded in a second waxy substance having a melting temperature lower than the temperature which would damage said cloth and impregnated in the center region only by an abrasive completely dried from a slurry including an anhydrous organic solvent capable of fluidizing the waxy substance.

2. A method according to claim 1 in which the first lapping step is continued until the slurry completely dries, whereupon the waxy substance readheres to the first surface of the cloth.

3. A method of polishing a water-soluble crystal having a hardness less than 3 Mohs, comprising the steps of beveling the edges of the crystal to prevent crumbling,
   lapping the crystal surface on a first surface of nylon cloth embedded in paraffin on a flat surface and saturated in the center region only with an abrasive of diameter less than $0.3\ \mu$ meters in benzene, and
   lapping the crystal surface on a second surface of nylon cloth embedded in paraffin on a flat surface and impregnated in the center region only with an abrasive of diameter less than $0.3\ \mu$ meters completely dried from a slurry including benzene.

4. A method according to claim 3 in which
   the first lapping step is continued until the benzene completely evaporates, whereupon the paraffin rebonds the nylon to the flat surface in the center region.

5. A method of polishing a water-soluble crystal including at least one oxygen atom in each crystalline unit cell and having a hardness less than 3 Mohs, comprising the steps of beveling the edges of the crystal to prevent crumbling,
   lapping the crystal surface on a first surface of nylon cloth of mesh greater than 60, said nylon cloth being embedded in paraffin on a flat metallic surface and saturated in the center region only with an abrasive of diameter less than $0.3\ \mu$ meters in benzene, and
   lapping the crystal surface on a second surface of nylon cloth of mesh greater than 60, said nylon cloth being embedded in paraffin on a flat metallic surface and impregnated in the center region only with an abrasive of diameter less than $0.3\ \mu$ meters completely dried from a slurry including benzene.

6. A method of polishing a water-soluble crystal including at least one oxygen atom in each crystalline unit cell and having a hardness less than 3 Mohs, comprising the steps of
   beveling the edges of the crystal to prevent crumbling,
   smoothing nylon cloth into molten paraffin on a flat surface to make a lap for said crystal,
   embedding an abrasive of particle diameter less than $0.3\ \mu$ meters in said paraffin and said cloth in the central portion of said lap, and
   lapping said crystal on said lap in said central portion.

7. A method according to claim 6 in which the embedding step includes
   supplying said abrasive to the lap in an anhydrous organic solvent that attacks the paraffin and that upon evaporation permits the residue to bond the nylon cloth to the flat surface, and
   lapping another crystal at least as soft as the first-mentioned crystal in the central portion of the lap while the solvent is evaporating until the solvent completely evaporates.

8. A method according to claim 6 in which the embedding step includes
   supplying the abrasive to the lap in an anhydrous organic solvent that attacks the paraffin and that upon evaporation permits the residue to bond the nylon cloth to the flat surface, and
   lapping the crystal in the central portion of the lap in the presence of the solvent and continuously until after the solvent has evaporated.

9. A method according to claim 6 in which the embedding step includes supplying the abrasive to the lap in an anhydrous organic solvent that attacks the paraffin and that upon evaporation permits the residue to bond the nylon cloth to the flat surface, and in which the lapping step is commenced after the solvent has evaporated.

10. A method of polishing a water-soluble crystal including at least one oxygen atom in each crystalline unit cell and having a hardness less than 3 Mohs, comprising the steps of
    beveling the edges of the crystal to prevent crumbling,
    lapping the crystal on a dry lapping surface appropriate for obtaining a nearly flat crystalline surface, lapping the crystal on a cloth lapping surface wet with a slurry containing benzene and a 0.3 micron-diameter abrasive particles to remove major scratches and lapping the crystal on nylon cloth bonded to a flat surface by paraffin and affected in a central region only with a slurry composed essentially of benzene and abrasive particles of diameter at least as small as 0.3 micron, this last-mentioned lapping step being performed after the benzene has evaporated.